United States Patent
Yasumoto et al.

(10) Patent No.: US 6,187,464 B1
(45) Date of Patent: Feb. 13, 2001

(54) METHOD FOR ACTIVATING FUEL CELL

(75) Inventors: Eiichi Yasumoto, Katano; Hisaaki Gyoten, Shijonawate; Kazuhito Hatoh, Daito; Kazufumi Nishida, Moriguchi; Teruhisa Kanbara, Ikeda, all of (JP)

(73) Assignee: Matsushita Electric Industrial Co., Ltd., Osaka-Fu (JP)

( * ) Notice: Under 35 U.S.C. 154(b), the term of this patent shall be extended for 0 days.

(21) Appl. No.: 09/322,948

(22) Filed: May 28, 1999

(30) Foreign Application Priority Data

Jun. 1, 1998 (JP) ................................................. 10-150988
Jun. 15, 1998 (JP) ................................................. 10-166637

(51) Int. Cl.$^7$ ....................................................... H01M 8/00
(52) U.S. Cl. ................................ 429/13; 429/17; 429/19; 429/23; 429/33; 429/40; 429/52
(58) Field of Search ................................. 429/13, 23, 33, 429/52, 40, 17, 19

(56) References Cited

U.S. PATENT DOCUMENTS 5,677,073 * 10/1997 Kawatsu .................................. 429/23
5,786,104 * 7/1998 Black et al. ........................... 429/13
5,925,476 * 7/1999 Kawatsu ................................. 429/23

FOREIGN PATENT DOCUMENTS

| 0 716 463 A2 | 6/1996 | (EP) . |
| 0 828 303 A2 | 3/1998 | (EP) . |
| 6-196187 | 7/1994 | (JP) . |

* cited by examiner

*Primary Examiner*—Bruce F. Bell
(74) *Attorney, Agent, or Firm*—Akin, Gump, Strauss, Hauer & Feld, LLP.

(57) ABSTRACT

A method for activating a polymer electrolyte type fuel cell comprising at least one unit cell which is configured by including a proton conductive polymer electrolyte, an electrode layer having a catalytic activity arranged on the both faces of said polymer electrolyte membrane and a gas-supplying path is disclosed. This method comprises at least one of the step (a) of enhancing the catalytic activity of said electrode and the step (b) of giving a wetting condition to said polymer electrolyte. According to the present invention, it is possible to readily activate the fuel cell and to cause the same to demonstrate a high cell performance.

8 Claims, 4 Drawing Sheets

METHOD FOR ACTIVATING FUEL CELL

BACKGROUND OF THE INVENTION

The present invention relates to fuel cells and, in particular, to a method for activating solid polymer electrolyte type fuel cells.

In recent years, with the social trend for the growing concern about the environmental protection problems, the development on the solid polymer electrolyte type fuel cell (hereinafter, to be briefly referred to as "PEFC") is under remarkable progress in the field of the fuel cells. Although the fuel cells are in their step of just being to put to practical uses, they are still not satisfactory due to many reasons.

The conventional PEFC is configured by including a proton conductive polymer electrolyte membrane, a pair of positive and negative electrodes, bipolar plates made of carbon or metal, and cooling plates. Each electrode is configured by including a mixture of carbon powder with catalyst powder such as Pt. And, if required, a water-repelling agent such as a fluorocarbon compound is added to the mixture. The electrode is configured by joining on a gas-diffusing layer and the electrode is combined with the proton conductive polymer film. In a case of using pure hydrogen as the fuel gas, it is possible to use the same material for configuring both the positive electrode and the negative electrode.

(1) Problems due to the fuel.

Usually, fuel gas or a fuel gas obtained by reforming of methanol or methane gas is used for the fuel cells. However, in the particular case of PEFC which usually employs a platinum catalyst in the electrode, there is a problem of poisoning the platinum catalyst by carbon monoxide in fuel gas, thereby decreasing the catalytic activity and inviting a serious deterioration in the cell performance.

In order to avoid this problem, there have been proposed various methods. As one of them, there is a hydrogen separating method, whereby the carbon monoxide in the fuel gas is removed by the use of a Pd thin membrane in advance of the introduction of the fuel gas into the PEFC. In this method, hydrogen is selectively caused to pass through a Pd membrane selectively by applying a certain pressure at one side of the thin membrane. This method is already used in a plant for manufacturing semiconductor devices or the like, and is under development also for the PEFC.

As another method for decreasing the CO concentration of the fuel gas, a so-called CO-denaturing method is proposed. In this method, after reforming methanol or methane gas, the CO was removed from the reformed gas by the use of a CO-denaturing catalyst ($CO+H_2O \rightarrow CO_2+H_2$). By this method, it is usually possible to decrease the CO concentration of the reformed gas down to 0.4 to 1.4%. If the CO concentration can be decreased to this extent, the reformed gas can be used for a phosphoric acid type-fuel cell which also employs the same Pt electrode catalyst. However, in order to prevent the possible poisoning of the platinum catalyst in PEFC, the CO concentration should be decreased down to a level of at least several ppm, and thus the above-mentioned CO-denaturing method is still not satisfactory.

Under the stated circumstances, another method is proposed for further removing the CO in the CO-denatured gas by further introducing oxygen (air) into the CO-denatured gas, thereby oxidizing the CO by the use of an oxidizing catalyst at 200 to 300° C. For the oxidizing catalyst used in this method, an alumina catalyst which carries a noble metal is proposed, for example. It is however very difficult to selectively and completely oxidize the CO in the hydrogen.

Further, although various investigations of an alloy catalyst are conducted to have higher resistance against the poisoning by CO, the performance of such an electrode catalyst is not satisfactory and, thus, it is difficult to develop an electrode catalyst which does not completely adsorb CO.

Moreover even if, the CO-oxidizing method and the method of mixing air with the fuel gas are employed, it is difficult to sufficiently decrease the CO concentration down to the extent for the PEFC. There is a hazard of including a large amount of CO at a start-up stage of the fuel cell. Thus, there is a need for a long time period in order to be stabilized before introducing the fuel gas, or a need for separately providing a hydrogen reservoir (bomb) solely for the start-up. In addition, the CO is gradually accumulated in the fuel electrode even under normal operating conditions and the cell performance is gradually deteriorated. Once the cell performance has been deteriorated, it cannot be recovered automatically, and there is a need for removing the accumulated CO by oxidizing the CO by temporarily suspending the operation of the fuel cell and introducing a large amount of air, or replacing the whole electrode assembly with fresh one.

(2) Problems due to the water-repelling property of the polymer electrolyte membrane Incidentally, a compound having a main chain (repetitive unit) of $—CF_3—$ and a side chain containing sulfonic groups ($—SO_3H$) at the end functional group is generally used as the proton conductive polymer electrolyte. This type of electrolyte has a proton conductivity with water, which must be supplied from the outside. For that reason, the electrolyte must be constantly attached (in contact) with water under the operating condition of the cell. But the electrolyte has a strong acidity with containing water. Material of any parts and components of the cell, which are in direct contact with the electrolyte, should therefore have acid resistance.

Since the polymer electrolyte needs water, in a case of operating the PEFC, it is required to humidify the fuel and the air to a dew point before they are supplied to the cell. In particular, the higher the operating temperature of the cell is, the more important becomes the humidity control on the supplying gases.

In a case of loading a PEFC to operate just after the assembly, or in another case of loading the PEFC again which had been standing still in non-operated state for a long period, it is generally difficult to immediately obtain sufficient performance. The cause for this phenomenon is due to the fact that a long time is required for hydrating an electrode diffusing layer completely, because the electrode diffusing layer of the PEFC has been treated for water-repelling.

In addition, a long time is also required for sufficiently wetting the material, which is the same case of polymer electrolyte, contained in the electrode catalyst. Further, even if the cell is kept to a moderate temperature and the gases, which are adjusted to a moderate temperature and humidity, the electrode diffusing layer is hard to hydrate when the cell is left in the no-loaded state. Moreover, the material contained in the electrode catalyst is hard to humidify and, thus, it becomes hardly possible to derive the sufficient cell output unless the cell is continuously subjected to generate the electricity generation at a high current density for several days.

For the reasons mentioned above, in order to derive the cell with the high performance at an early stage, an activating treatment was conventionally practiced by, for instance, generating electricity at a higher current density with a pure oxygen, or by maintaining the cell voltage at about 0 V by regulating the potential while supplying a large amount of the fuel gases. Even with these methods, there is still a problem to be solved that a time period of more than several hours is required to derive the cell with the high performance.

It is therefore the primary object of the present invention to solve the above-mentioned problems (1) and (2). More specific objects of the present invention are to provide an easy and highly effective method for activating the fuel cell by preventing the deterioration in the cell performance due to CO poisoning or restoring the deteriorated cell performance, and a method for activating the fuel cell by reducing the delay in demonstrating the cell performance due to the water-repelling property of the polymer electrolyte membrane.

SUMMARY OF THE INVENTION

In order to solve the above-mentioned problems, the present invention provides a method for activating a polymer electrolyte type fuel cell comprising at least one unit cell which is configured by including a proton conductive polymer electrolyte, an electrode layer having a catalytic activity arranged on the both faces of said polymer electrolyte membrane and a gas-supplying path; comprising at least one of the step (a) of enhancing the catalytic activity of said electrode and the step (b) of giving a wetting condition to said polymer electrolyte.

In the present invention, the catalytic activity of said electrode is preferably enhanced by compulsively decreasing the output voltage of said polymer electrolyte type fuel cell in said step (a).

In concrete, the output voltage is preferably decreased down to 0 to 0.3 V per unit cell.

In this case, the output voltage of the unit cell may be intermittently decreased in succession. In other words, the output voltage may be decreased stepwise with some intervals.

Further, a wetting condition to said polymer electrolyte is preferably given by immersing and boiling said polymer electorolyte type fuel cell in a deionized water or a weakly acidic aqueous solution and boiling in said step (b).

A wetting condition to said polymer electrolyte may be given by introducing a deionized water or a weakly acidic aqueous solution having a temperature higher than an operating temperature of said polymer electrolyte type fuel cell into the gas-supplying path in said step (b).

It is preferable that an alcohol be introduced into a gas-supplying path before a deionized water or a weakly acidic aqueous solution in said step (b).

And, it is preferable that said weakly acidic aqueous solution is hydrogen peroxide water.

Further, it is preferable that an ion-exchange group in said polymer electrolyte is —$SO_3H$ and said weakly acidic aqueous solution is a diluted sulfuric acid aqueous solution.

It is noted that, in the present invention, the structure of the above-mentioned fuel cell is not specifically limited to those disclosed.

In this process, it is preferable to set the pressure of the deionized water or the weakly acidic aqueous solution to be introduced into the gas-supplying path to not less than 0.1 $kgf/cm^2$.

In another preferred embodiment, the above-mentioned step (a) is a step of performing electricity generation at an oxygen utilization rate of not less than 50% and, then, applying a voltage to the fuel cell so as to make the average cell voltage not more than 0.3 V per unit cell.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
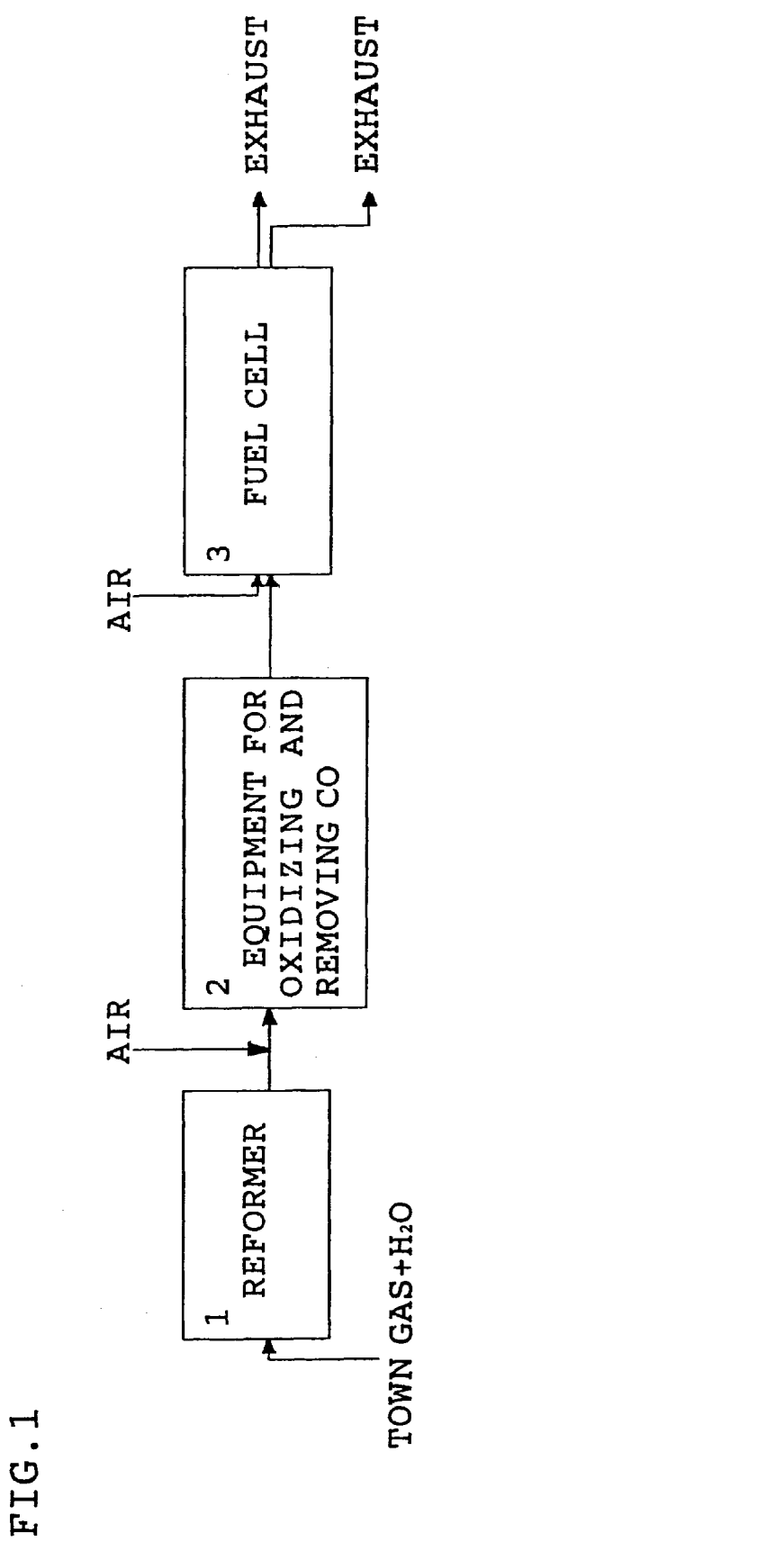
FIG. 1 is a schematic view showing a fuel cell system used in Example 1 of the present invention.

The method for activating the PEFC in accordance with the present invention is characterized by including the step (a) of enhancing the catalytic activity of the electrode which constitutes the PEFC, and the step (b) of giving a wetting condition to the polymer electrolyte.

The above-mentioned step (a) is provided for solving the above-mentioned problems (1), and the above-mentioned step (b) is provided for solving the above-mentioned problems (2).

In the operation of the PEFC for generating DC power, by introducing an oxidant gas and a fuel gas obtained by reforming a raw material gas of a hydrocarbon into the cell, the above-mentioned step (a) restores the catalytic activity of the electrode and maintains the output characteristic of the cell by compulsively decreasing the output voltage of the cell at an appropriate time to remove carbon monoxide adsorbed in the catalytically reactive portion of the electrode. If this step is adopted, it is possible to omit a hydrogen treatment which is required in the start-up stage of the cell. In addition, even if the performance of the fuel cell has once been deteriorated by a possible poisoning with CO, it is possible to easily remove the CO adsorbed on the catalyst and to restore the initial cell performance.

Further, the above-mentioned step (b) makes it possible to simply derive the sufficient cell output for the high performance, which is inherently held by the cell in a short period of time, by boiling the PEFC in a deionized water or in a weakly acidic aqueous solution. In this step, by boiling in the weakly acidic aqueous solution, impurity ions contained in the electrolyte membrane or in the material equivalent to the polymer electrolyte in the electrode catalytic layer are exchanged with protons and, thus, it is possible to derive a higher performance of the PEFC.

However, it seems rather difficult to boil the PEFC having a large area and a high lamination from the viewpoints of the capacity of the container to be employed and of the handling in the process. For that reason, by introducing the deionized water or the weakly acidic aqueous solution having a higher temperature than a previously determined cell operating temperature into the gas-supplying path of the PEFC, instead of using the container for the boiling process, it is possible to simply derive the cell output for the high performance inherently held by the cell in a short time period. Further preferably, by setting the pressure of the water or solution to be introduced to not less than 0.1 kgf/cm², it is possible to derive the cell output sufficient for the high performance in a shorter time period.

Alternatively, by introducing an alcohol, which has some affinity to the carbon materials at the diffusing layer of the electrode, into the gas-supplying path of the PEFC, it is also possible to instantly replace alcohol by water at the diffusing layer. Thereafter, by washing the PEFC with the deionized water or the weakly acid aqueous solution, it is possible to simply hydrate the electrode diffusing layer in a short time period, thereby deriving the cell output sufficient for the high performance which is inherently held by the cell.

During this procedure, when a residual alcohol is present at the side of the fuel electrode, the alcohol is oxidized by the electrode catalyst to produce a substance, which may poison the electrode. In order to derive the cell output sufficient for the high performance which is inherently held by the cell, it is important to thoroughly hydrate the electrode diffusing layer at the positive electrode side rather than at the fuel electrode side. For that reason, a satisfactory effect can be obtained by supplying the alcohol only to the positive electrode side, to which the air is supplied. In addition, it is further desirable to supply an oxidant gas to the fuel electrode side after the activating treatment for some period of time so as to further oxidize and remove the electrode poisoning substance and, thereafter, to supply the fuel gas.

Further, in a case of using a compound having a main chain (repetitive unit) of —CF₃— and side chain containing a sulfonic group (—SO₃H) as the end functional group for the polymer electrolyte, it is desirable to employ an aqueous solution of diluted sulfuric acid as the weakly acidic aqueous solution for activating the compound. The reason for this is due to the fact that any sulfuric acid ion may not remain even if the diluted sulfuric acid is introduced into the polymer electrolyte, because the ion exchanging group of the polymer electrolyte is —SO₃H. As such a compound, the compound represented by the formula:

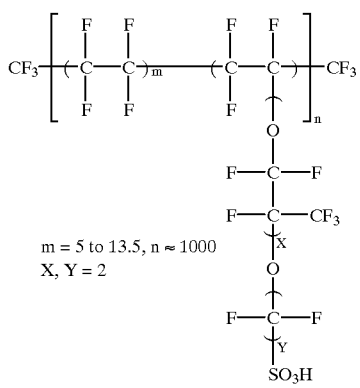

my be exemplified preferably.

In addition, there is a need for removing any metal ion from the deionized water or the weakly acidic aqueous solution to be introduced into the PEFC at the activating step. The reason for this is due to the fact that if a metal ion exists in the water or solution, the ion exchanging group in the polymer electrolyte, for instance, —SO₃H group combines with the metal ion to produce —SO₃Me (Me is a metal element), thereby to losing the ion exchanging ability. In order to prevent this adverse phenomenon, it is particularly useful to use hydrogen peroxide water which consists of pure water and hydrogen as the weakly acidic aqueous solution.

Separate from this, by causing the PEFC to generate electricity at an oxygen utilization rate of not less than 50%, in other words by making the positive electrode side of the cell a half-suffocated state, and by keeping the average cell voltage to not higher than 0.3 V thereby evolving the required water vapor from the cell, it is possible to simply derive the cell output sufficient for the high performance which is inherently held by the cell in a short time period.

In the following paragraphs, a description will be made of the method for activating the fuel cell in accordance with the present invention by way of example, but the present invention should not be construed to be limited to these examples.

EXAMPLES

Examples 1 Through 3

First, a PEFC to be used in this example was configured in the following manner. By causing a carbon powder of acetylene black to carry platinum particles having an average particle diameter of about 30 Å at 25 wt %, the catalyst for the reacting electrode was prepared. By mixing a dispersion prepared by dispersing the catalyst powder in isopropanol and a dispersion prepared by dispersing a powder of perfluorocarbon sulfonic acid in ethanol, a paste like product was obtained. On one face of a non-woven fabric, which was made of carbon and had a thickness of 250 μm, a catalyst-reacting layer was formed by painting the paste by means of screen printing process. During this process, the amount of the platinum contained in the formed reacting electrode was adjusted to 0.5 mg/cm², and the amount of the perfluorocarbon sulfonic acid was adjusted to 1.2 mg/cm².

The same configuration was adopted to both the positive electrode and the negative electrode, and the electrode plate was formed to have a one-size larger area than that of the electrodes. Next, as a proton-conductive polymer electrolyte, a thin film of perfluorocarbon sulfonic acid having a thickness of 25 μm was used. And, the electrode plates were joined with the electrolyte film by means of hot-pressing process so as to make the printed catalyst layers in close contact with the electrolyte film at their central portions, thereby producing an electrode/electrolyte/electrode (MEA, Membrane Electrode Assembly).

Next, a gasket-like sealing, which has ports for the electrode and the gas-manifold, was prepared by molding into a plate-shape. A portion of the electrolyte film around the peripheral of the MEA was sandwiched between the two gasket-like sealings so that the reacting electrode portion of the MEA was fitted to the port for the reacting electrode, which was positioned in the center of the gasket-like sealing. Further, the MEA and the gasket-like sealing were sandwiched between two bipolar plates in an arrangement wherein the gas-flowing path in one bipolar plate confronted with that of the other bipolar plate, thereby configuring a unit cell of polymer electrolyte type fuel cell(PEFC). The gasket-like sealing in the form of a molded sheet was made by punching a sheet of butyl rubber with a thickness of 250 μm to have the required ports.

By providing a heater in the form of plate having the ports for the gas-manifold, a current collector, an insulating plate, and end plates on both the outer sides of this MEA and, then, by fastening the cell while applying a pressure of 20 kg/cm² for the unit area of the electrode between the outermost end plates with bolts, springs and nuts, a unit cell of the PEFC was configured. By laminating 50 pieces of this unit cells, a PEFC module was produced.

While maintaining the module thus produced at 75° C., hydrogen gas heated and humidified so as to have a dew point of 73° C. was supplied to one of the electrode sides and air heated and humidified so as to have a dew point of 68° C. was supplied to the other of the electrode sides. As the result, an open circuit voltage of 0.98 V was obtained.

FIG. 1 schematically shows a structure of a fuel cell system used in this example. In FIG. 1, a methane gas was introduced into the reforming unit 1 at a S/C (steam/carbon) ratio of 3 to reform with steam and, then, the CO in the reformed gas was denatured. The reformed gas exhausted from the reforming unit 1 was then introduced into a CO-oxidizing and removing unit 2 so as to make the $O_2/CO$ ratio in the gas 1, and finally introduced into the cell module 3.

During an operation in the steady state, the CO concentration of the fuel gas to be introduced into the cell module was not more than 100 ppm. At the start-up stage, the CO concentration of the fuel gas, however, was not less than 1%. The operating temperature of the PEFC was set to 80° C. And, when the gas was humidified, the temperature of the fuel gas was set to 75° C. and the temperature of the oxidant gas (air) was set to 65° C.

Figure 2:
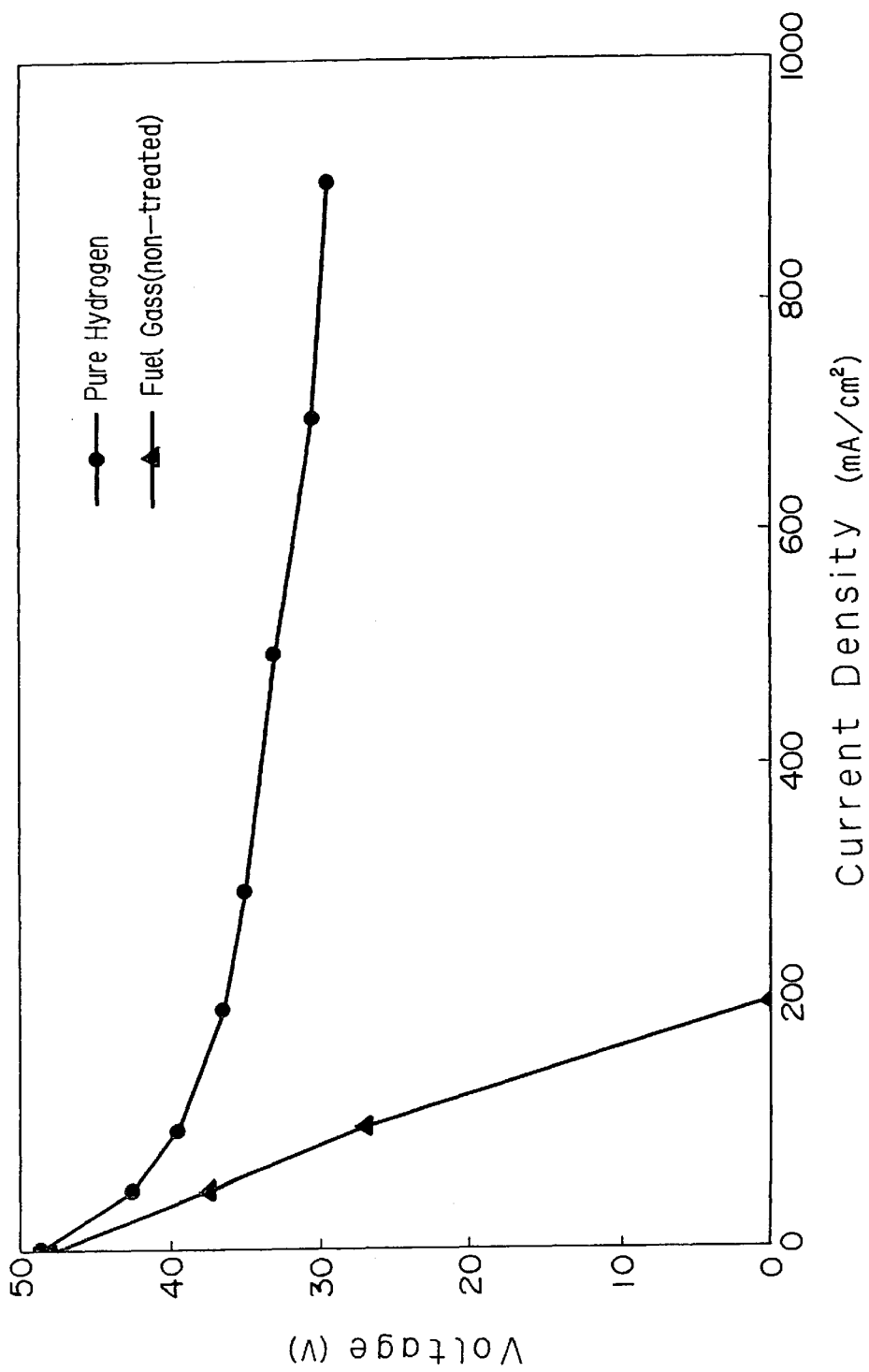
FIG. 2 is a diagram showing a current-voltage characteristic of the fuel cell used in Example 1 of the present invention.

First, an evaluation was conducted on the characteristic of the fuel cell in a case of introducing the fuel gas into the PEFC immediately after the starting-up without subjecting the fuel gas to any treatment. FIG. 2 shows the current-voltage characteristic obtained in the case of the above-evaluation in comparison with that obtained in another case of introducing pure hydrogen. Based on this evaluation, it was found that the cell characteristic is remarkably deteriorated when a fuel gas in the untreated state was introduced into the PEFC immediately after the starting-up.

Figure 3:
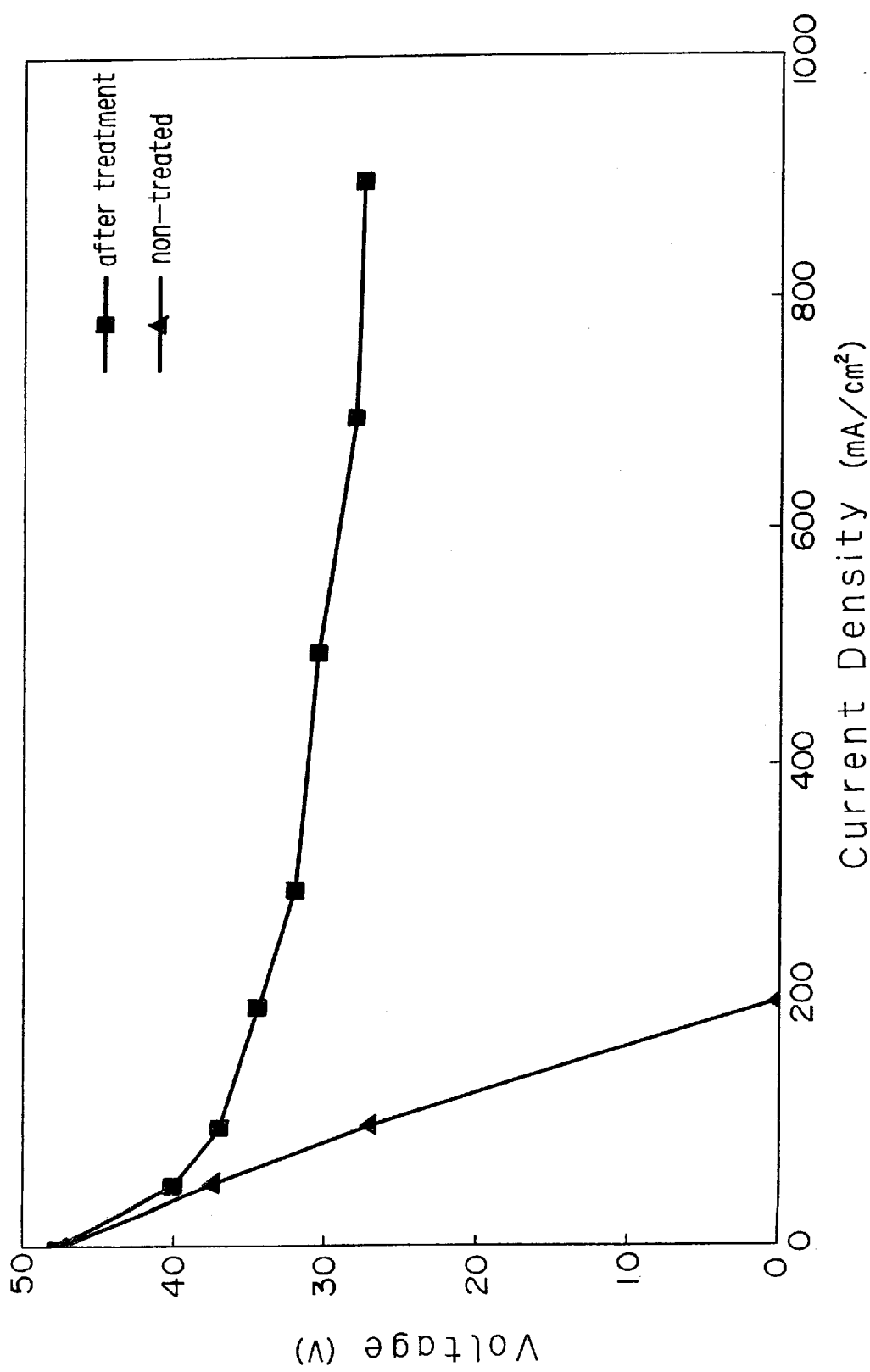
FIG. 3 is a diagram showing a current-voltage characteristic of the fuel cell used in Example 1 of the present invention.

Subsequently, an evaluation was conducted on the activating method in accordance with the present invention (Example 1). That is, the cell performance was examined in the state where the closed-circuit voltage of the PEFC at the start-up stage was decreased to 0.2 V for 2 seconds by connecting an appropriate resistance between the output terminals of the cell. FIG. 3 shows the current-voltage characteristic obtained in the case of the above examination in comparison with that obtained in the case of no treatment. Based on the evaluation, it was found that the cell characteristic was improved by temporarily decreasing (short-cutting) the cell voltage.

This phenomenon is caused by the fact that the electrode potential in the MEA is decreased down to an oxidation potential of CO by compulsively decreasing the output voltage of the PEFC, thereby oxidizing the CO adsorbed on the Pt catalyst.

Next, an investigation was conducted on the cell performance by varying the duration of the time period to decreases the cell voltage of the PEFC (Example 2). Table 1 below shows the relationship between the duration and the cell voltage. The duration was the period of time that the output voltage of the fuel cell was maintained to 10 V, i.e., 0.2 V per unit cell after the starting-up of the fuel cell. And, the cell voltage was the closed-circuit voltage of the fuel cell at the time when the output current was set to 500 $mA/cm^2$ after the compulsive decreasing. From Table 1, it is appreciated that when the duration for compulsively decreasing the cell voltage is not more than 10 seconds, the cell performance is improved. Whereas, if the duration is made longer than this, the cell performance is deteriorated in contrast.

TABLE 1

| VOLTAGE DECREASING DURATION (sec) | CELL VOLTAGE (V) |
|---|---|
| PURE HYDROGEN | 33 |
| 0.01 | 29 |
| 0.5 | 30 |
| 1 | 31 |
| 5 | 32 |
| 10 | 33 |
| 15 | 31 |
| 20 | 29 |

Next, an investigation was conducted on the cell performance obtained by varying the duration of time when the output voltage of the PEFC was compulsively decreased (Example 3). Table 2. below shows the relation between the decreased voltages of the fuel cell obtained by fixing the duration of compulsively decreasing the cell voltage to 5 seconds, and the closed-circuit voltage of the fuel cell when the output current is set to 200 $mA/cm^2$, obtained after subjecting the cell to this step. When a range of the compulsively decreased voltage was 0 to 0.3 V per unit cell, the cell demonstrated almost equivalent performance to the case of using pure hydrogen. But a restoring rate of the cell voltage was small outside the above range and the voltage become not less than 5 V lower than that in the case of using pure hydrogen.

TABLE 2

| VOLTAGE WHEN DECREASED COMPULSIVELY (V) | CELL VOLTAGE (V) |
|---|---|
| PURE HYDROGEN | 36 |
| 40 | 2.5 |
| 30 | 10 |
| 20 | 30 |
| 15 | 34 |
| 10 | 34 |
| 5 | 35 |
| 2.5 | 35 |
| 0 | 35 |

Based on the above evaluations, it is found that there are effective ranges in the duration and the voltage for compulsively decreasing the output voltage of the PEFC, which may be selected or determined by considering the configuration of the cell. It is believed that if the duration for compulsively decreasing the cell voltage is unnecessarily elongated, the closed-circuit voltages of some cells in the serially-connected 50 unit cells might become less than 0 V and minus volt, i.e., a polarity-inverted state. As a means for avoiding the occurrence of such a state, it is effective to adopt a method of compulsively decreasing the output voltage of the fuel cell module as a whole while monitoring the voltages of the respective unit cells within a range where no polarity-inverted cell is produced.

Example 4

Figure 4:
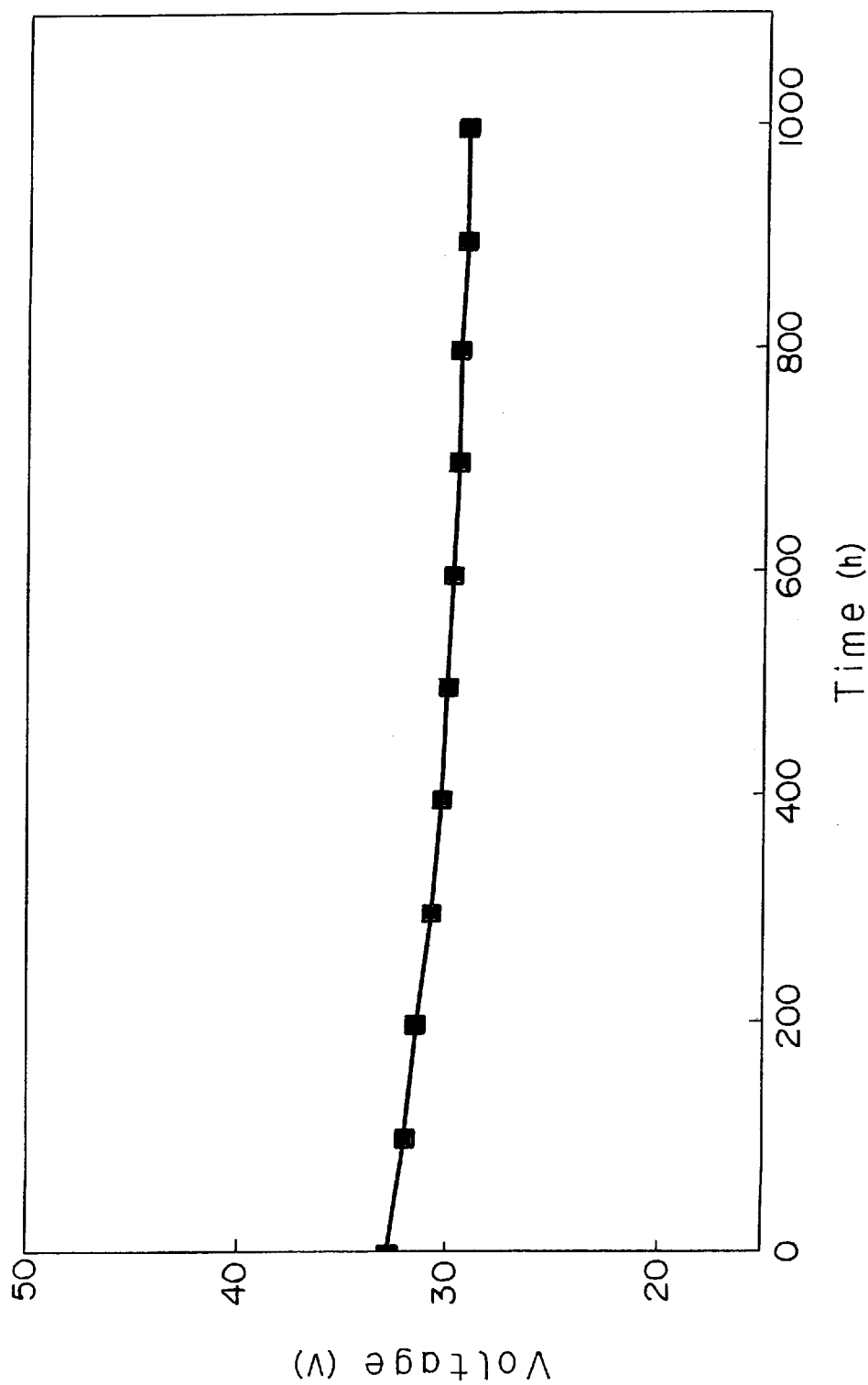
FIG. 4 is a diagram showing the relationship between the operation time and the voltage of the fuel cell used in Example 2 of the present invention.

In this example, the PEFC produced in the same manner as in Example 1 was used. At the start-up stage, the cell stood still for not less than 1 hour before introducing the fuel gas into the fuel cell. And, the gases were introduced after the CO concentration of the fuel gas became less than 100 ppm. Then, the PEFC was discharged continuously at 500 mA/cm² for 1,000 hours. FIG. 4 shows the relation between the voltage and the duration of the continuous discharging.

From FIG. 4, it is appreciated that the voltage was decreased by 10% as compared with that at the initial period. Therefore, an attempt was made at this time point for decreasing the cell voltage temporarily. After decreasing the output voltage of the PEFC from 47 V to 5 V for 5 seconds, the discharging at 500 mA/cm² was performed again. As the result, it was appreciated that the cell voltage was greatly improved as compared with that immediately before this treatment.

Next, an investigation was conducted on the characteristic of the PEFC after the treatment by changing the number of the treatment. Table 3 shows the cell voltage after each number of the treatment. From this result, it is appreciated that the larger the number of the temporal decreasing of the cell voltage is, the higher the effect thereof becomes.

TABLE 3

| TREATMENT NUMBER (times) | CELL VOLTAGE (V) |
| --- | --- |
| 1 | 32 |
| 2 | 32 |
| 5 | 33 |
| 7 | 33 |
| 10 | 33 |
| 15 | 34 |
| 20 | 34 |

Based on the results, it is found that by temporarily and compulsively decreasing the cell output voltage of the PEFC, it is possible to solve the problem of poisoning the electrode catalyst by CO at the start-up stage of the PEFC which had conventionally been left to be solved, and to use the fuel gas as it is.

In addition, it is also found that in a case where the performance of the PEFC in the steady state operation is deteriorated by CO poisoning, it is possible to restore the cell performance up to the performance almost equal to that at the initial stage by temporarily and compulsively decreasing the cell output voltage.

Furthermore, it was also found that in a case wherein the duration for temporarily decreasing the cell output voltage was not more than 10 seconds or the number is not less than 2, or the voltage for the temporal decrease was in a range of 0 to 0.3 V for a unit cell, the effect of the treatment was obtained. In the foregoing examples, a fuel gas obtained by reforming a methane gas was used, but the present invention is not specifically limited thereto. In addition, any catalyst other than those disclosed such as an alloy catalyst or the like can also be used as the electrode catalyst for the PEFC of the present invention.

Example 5 and Comparative Example 1

A unit cell of a PEFC was configured as in the same manner as in Example 1.

The obtained unit cell was boiled in a ion-exchanged and distilled water for one hour.

Thereafter, while keeping the unit cell (PEFC) at 75° C., hydrogen gas, which was humidified and heated so as to have a dew point of 73° C., was supplied to one of the electrode sides and air, which was humidified and heated so as to have a dew point of 68° C. was supplied to the other of the electrode sides. A non-loaded cell voltage of 0.98 V was obtained with the unit cell in this state. In addition, when a continuous electricity generating test was conducted on this unit cell under the conditions of a fuel utilization rate of 80%, an oxygen utilization rate of 40% and a current density of 0.3 A/cm², a cell voltage of not less than 0.7 V was obtained immediately after the start of the test. Moreover, the cell was able to generate electricity for further 5,000 hours or longer while maintaining the cell voltage of not less than 0.7 V without any deterioration in the cell voltage.

For comparison, another PEFC of the same configuration was produced without subjecting the same to the activation treatment, i.e., without being boiled in the deionized and distilled water, and an electricity generating test was conducted on the cell under the same conditions. As the result, it was found that a non-loaded cell voltage of only 0.93 V was obtained. In addition, this unit cell did not operate in the initial stage under the conditions of a fuel utilization rate of 80%, an oxygen utilization rate of 40% and a current density of 0.3 A/cm², and when the unit cell was compulsively loaded, the output cell voltage of this cell was decreased down to 0 V or lower. Therefore, an electricity generating test was conducted on this unit cell under the conditions of a fuel utilization rate of 70%, an oxygen utilization rate of 20% and a current density of 0.1 A/cm², and after recognizing a gradual improvement in the cell performance, the load was increased up to 0.7 A/cm² stepwise. The above-mentioned procedure was repeated three times and the gas utilization rate and the like was turned to the initial conditions. Thereafter, it took about three days to obtain the cell voltage of above 0.7 V at a load of 0.3 A/cm².

Although the case of boiling the cell in a deionized and distilled water was disclosed in this example, a similar technical advantage was obtained with a cell, which was stored in a hydrogen peroxide water having a pH of 5 for 2 hours.

Example 6

By closely stacking and serially connecting 100 unit cells of the PEFC, a laminated cell was produced. Each unit cell was produced in the same manner as in Example 5. Then, current collectors and insulating plates, each provided with ports required for the gas manifolds and the cooling water manifolds, respectively, as well as end plates were provided on the both outside ends of the obtained laminated cell for combining the laminated unit cells together. And, then, the combined body was fastened between both the outermost end plates by the uses of bolts, springs and nuts, at a pressure of 20 kg/cm² for the unit area of the electrode to obtain a PEFC module.

An aqueous solution of sulfuric acid of 0.01 N and 95° C. was introduced into the module through both the gas inlet openings at the positive electrode side and the negative electrode side for 30 minutes. At that time, by narrowing an exhausting outlet, the pressure of the introducing aqueous solution was adjusted to 0.1 kgf/cm².

Thereafter, while maintaining the temperature of the PEFC module at 75° C. by circulating cooling water, hydrogen gas, which was humidified and heated to have a dew point of 73° C., was supplied to one of the electrode sides and an air, which was humidified and heated to have a dew point of 68° C., was supplied to the other of the electrode sides. Thereby, the open-circuit voltage of 0.98 V was obtained. In addition, as the result of conducting a continuous electricity generating test on this cell module under the conditions of a fuel utilization rate of 80%, an oxygen utilization rate of 40% and a current density of 0.3 A/cm², a cell voltage of above 0.7 V was obtained immediately after the start of the test. Moreover, the cell was able to generate electricity for further 5,000 hours or longer while maintaining the cell voltage of above 0.7 V without any deterioration in the cell voltage.

Although the case of activating the cell by introducing the sulfuric acid aqueous solution of 0.01 N and 95° C. into both the gas inlet openings at the positive electrode side and the negative electrode side of the unit cell for 30 minutes is disclosed in this example, a similar technical advantage was obtained with a cell, which was activated by introducing a hydrogen peroxide water having a pH of 5 and a temperature of 90° C. for 1 hour. In addition, a similar technical advantage was also obtained with a cell, which was activated by introducing a deionized water of 95° C. for 3 hours.

Example 7

After supplying about 100 cc of methanol to the unit cell of the PEFC, which was produced in the same manner as in Example 5 through the gas supplying inlet, the unit cell was washed by supplying ion-exchanged and distilled water. Thereafter, the PEFC was kept at a temperature of 75° C., and an air, which was humidified and heated to have a dew point of 70° C., was supplied to both the electrode sides for 1 hour, and the gas at the fuel electrode side was replaced with nitrogen. Subsequently, a hydrogen gas, which was humidified and heated to have a dew point of 73° C., was supplied to the fuel electrode side and an air, which was humidified and heated to have a dew point of 68° C., was supplied to the air electrode side. Thereby, the cell voltage of 0.98 V was obtained in the non-loaded state. In addition, as the result of conducting a continuous electricity generating test on this cell under the conditions of a fuel utilization rate of 80%, an oxygen utilization rate of 40% and a current density of 0.3 A/cm$^2$, a cell voltage of above 0.7 V was obtained immediately after the start of the test. Moreover, the cell was able to generate electricity for further 5,000 hours or longer while maintaining the cell voltage of not less than 0.7 V without any deterioration in the cell voltage.

In this example, although the cell was activated by supplying the ion-exchanged and distilled water, after the supply of methanol in this example, a similar technical advantage was obtained with a cell, which was activated by introducing a hydrogen peroxide water having a pH of 5 for 1 hour. In addition, a similar technical advantage was also obtained by using an aqueous solution of sulfuric acid having a pH of 5.

Example 8

The unit cell of the PEFC, which was produced in the same manner as in Example 5, was heated up to 75° C. without subjecting the same to any activating treatment. And, hydrogen, which was humidified and heated to have a dew point of 73° C., was supplied to the fuel electrode side and an air, which was humidified and heated to have a dew point of 68° C., was supplied to the air electrode side. Thereby, the open-circuit voltage of 0.93 V was obtained. Next, this cell was maintained to generate electricity at low potential of the cell voltage of 0.1 V for one hour, while adjusting the gas flow rate so as to have the fuel utilization 90% and the oxygen utilization rate 60%.

Thereafter, as the result of conducting a continuous electricity generating test on this cell under the conditions of a fuel utilization rate of 90%, an oxygen utilization rate of 60% and a constant current density of 0.3 A/cm$^2$, a cell voltage of not less than 0.7 V was obtained immediately after the start of the test. Moreover, the cell was able to generate electricity for further 5,000 hours or longer while maintaining the cell voltage of above 0.7 V without any deterioration in the cell voltage.

In this example, although the voltage applied to the cell for activation was set to 0.1 V for a unit cell, the technical advantage was remarkably deteriorated at a voltage higher than 0.3 V. In addition, if the cell voltage was lowered to below 0 V and the lowered voltage was applied for a long time period, the output characteristic of the cell was deteriorated. This is believed to be due to the fact that if the applied voltage is lowered to less than 0 V, a so-called polarity-inverted phenomenon of the cell occurs to break a part of the cell reaction component.

INDUSTRIAL APPLICABILITY

As clearly disclosed in the foregoing examples, according to the present invention, it is possible to introduce the fuel gas into the cell at the start-up stage as it is. In addition, even if the performance of the fuel cell was once deteriorated by CO, it is possible to remove the CO adsorbed on the fuel electrode with ease and to restore the cell performance, by temporarily decreasing the cell voltage.

Further, according to the present invention, it is possible to simply derive the cell output at the high performance which has inherently been held by the PEFC in a short time, by boiling the PEFC in a deionized water or in a weakly acidic aqueous solution. In addition, it is also possible to simply derive the cell output at its high performance which has inherently been held by the PEFC in a short time, by introducing a deionized water or a weakly acidic aqueous solution at a temperature higher than the previously determined cell operating temperature into the gas supply paths of the PEFC. Further preferably, by pressurizing the water head at that time up to not less than 0.1 kgf/cm$^2$, it is possible to derive the cell output at its high performance in a shorter time period.

Moreover, after introducing an alcohol into the gas supply paths of the PEFC, by washing the gas supply paths with a deionized water or a weakly acidic aqueous solution, it is also possible to simply derive the cell output at its high performance which has inherently been held by the cell in a short time.

In addition, by operating the PEFC for generating electricity at an oxygen utilization rate of above 50% and keeping it to a state of an average cell voltage of below 0.3 V per unit cell for more than 10 seconds, it is also possible to simply derive the cell output at its high performance which has inherently been held by the cell in a short time.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for activating a polymer electrolyte fuel cell comprising at least one unit cell which is configured by including a proton conductive polymer electrolyte, an electrode layer having a catalytic activity arranged on the both faces of said polymer electrolyte and a gas-supplying path;

comprising at least one of step (a) of enhancing the catalytic activity of said electrode and step (b) of giving a wetting condition to said polymer electrolyte; and wherein catalytic activity of said electrode is enhanced by compulsively decreasing the output voltage of said polymer electrolyte fuel cell in said step (a).

2. The method for activating a polymer electrolyte fuel cell in accordance with claim 1, wherein the output voltage is decreased down to 0 to 0.3 V per unit cell.

3. The method for activating a polymer electrolyte fuel cell in accordance with claim 1, wherein the output voltage of the unit cell is intermittently decreased in succession.

4. A method for activating a polymer electrolyte fuel cell comprising at least one unit cell which is configured by including a proton conductive polymer electrolyte, an electrode layer having a catalytic activity arranged on the both faces of said polymer electrolyte and a gas-supplying path;

comprising at least one of step (a) of enhancing the catalytic activity of said electrode and step (b) of giving a wetting condition to said polymer electrolyte; and wherein a wetting condition to said polymer electrolyte is given by immersing and boiling said polymer electrolyte fuel cell in a deionized water or a weakly acidic aqueous solution and boiling in said step (b).

5. A method for activating a polymer electrolyte fuel cell comprising at least one unit cell which is configured by including a proton conductive polymer electrolyte, an electrode layer having a catalytic activity arranged on the both faces of said polymer electrolyte and a gas-supplying path;

comprising at least one of step (a) of enhancing the catalytic activity of said electrode and step (b) of giving a wetting condition to said polymer electrolyte; and wherein a wetting condition to said polymer electrolyte is given by introducing a deionized water or a weakly acidic aqueous solution having a temperature higher than an operating temperature of said polymer electrolyte fuel cell into the gas-supplying path in said step (b).

6. The method for activating a polymer electrolyte fuel cell in accordance with claim 5, wherein an alcohol is introduced into a gas-supplying path before a deionized water or a weakly acidic aqueous solution in said step (b).

7. The method for activating a polymer electrolyte fuel cell in accordance with claim 5, wherein said weakly acidic aqueous solution is hydrogen peroxide water.

8. The method for activating a polymer electrolyte fuel cell in accordance with claim 5, wherein an ion-exchange group in said polymer electrolyte is —$SO_3H$ and said weakly acidic aqueous solution is a diluted sulfuric acid aqueous solution.

* * * * *